United States Patent
Bachhofer

(10) Patent No.: US 6,967,009 B2
(45) Date of Patent: Nov. 22, 2005

(54) OZONE GENERATOR

(75) Inventor: Bruno Bachhofer, Ravensburg (DE)

(73) Assignee: Hydro-Elektrik GmbH, Ravensburg (DE)

( * ) Notice: Subject to any disclaimer, the term of this patent is extended or adjusted under 35 U.S.C. 154(b) by 75 days.

(21) Appl. No.: 10/430,387

(22) Filed: May 7, 2003

(65) Prior Publication Data

US 2004/0028577 A1    Feb. 12, 2004

(30) Foreign Application Priority Data

May 7, 2002    (DE) ................................ 102 20 467

(51) Int. Cl.$^7$ .............................................. B01J 19/12
(52) U.S. Cl. ........................ 422/186.12; 422/186.07; 422/186.18; 422/186.19; 422/186.2
(58) Field of Search ...................... 422/186.07, 186.18, 422/186.19, 186.2, 186.12

(56) References Cited

U.S. PATENT DOCUMENTS 2,260,831 A * 10/1941 Daily ...................... 422/186.2
3,542,664 A    11/1970 Guillerd et al.
3,899,683 A    8/1975 Lowther
2001/0041154 A1    11/2001 Murata et al.

FOREIGN PATENT DOCUMENTS

| DE | 32 47 373 C2 | 5/1991 |
| DE | 103 17 475 A1 | 11/2003 |
| EP | 0 554 457 A1 | 8/1993 |
| EP | 0 952 108 A1 | 10/1999 |

* cited by examiner

Primary Examiner—Rodney G. McDonald
(74) Attorney, Agent, or Firm—McKenna Long & Aldridge, LLP.

(57) ABSTRACT

An ozone generator is proposed which comprises a plurality of plate-like ozone generating elements, stacked one on top of the other, which are in at least partial contact with a process water stream, each of the ozone generating elements having at least one plate-like, electrically insulated inner electrode and at least one likewise plate-like counterelectrode, between which a space is provided for a gas discharge. According to the invention, the ozone generating elements are situated at a distance from one another, perpendicular to their plate-like extension, in such a way that process water is able to flow between the ozone generating elements over substantial surface regions of the plate-like ozone generating elements.

9 Claims, 4 Drawing Sheets

OZONE GENERATOR

FIELD OF INVENTION

The invention relates to an ozone generator comprising a plurality of plate-like ozone generating elements, stacked one on top of the other, which are in at least partial contact with a process water stream, each of the ozone generating elements having at least one plate-like, electrically insulated inner electrode and at least one likewise plate-like counter-electrode, between which a space is provided for a gas discharge.

BACKGROUND OF THE INVENTION

An ozone generator having cylindrical plate electrodes in a stacked configuration is known from German Patent 32 47 373 C2, in which two insulating plates are situated between two solid outer electrodes separated at a distance from one another, and an inner electrode is situated between the two insulating plates, forming two discharge chambers. The inner electrode has an outer diameter which is smaller than the diameter of the insulating plates, between which an annular ring running in the vicinity of their edges is clamped. Together with the sealing elements, the stacked electrodes form a cylindrical block which is surrounded by externally flowing process water for cooling.

To enable the heat generated in the discharge chambers to dissipate, the solid electrodes must be made of aluminum, which allows good outward heat conductance to the process water.

However, it is this very use of aluminum which causes the heat removal in the aluminum electrodes to be the limiting factor in the design of the allowable maximum capacity.

BRIEF SUMMARY OF THE INVENTION

The object of the present invention is to provide a more effective design for an ozone generator of the aforementioned type, in particular with respect to the capacity.

This object is achieved by the features of Claim 1.

Advantageous and useful embodiments of the invention are stated in the subclaims.

The invention is directed to an ozone generator comprising a plurality of plate-like ozone generating elements, stacked one on top of the other, which are in at least partial contact with process water, that is, water enriched with ozone, each of the ozone generating elements having at least one plate-like, electrically insulated inner electrode and at least one likewise plate-like counterelectrode, between which a space is provided for a gas discharge. The essence of the invention lies in the fact that the ozone generating elements are situated at a distance from one another, perpendicular to their plate-like extension, in such a way that the process water is able to flow between the ozone generating elements over substantial surface regions of the plate-like ozone generating elements. This procedure is based on the knowledge that, in order to provide an ozone generator having a higher capacity with at least the same reliability, the ozone generator must be provided with significantly more effective cooling. By distancing the ozone generating elements from one another, the cooling surface is increased considerably in comparison to the known principle according to German Patent 32 47 373 C2. In this manner the individual ozone generating elements may be operated at significantly higher capacities without overheating, thereby enabling correspondingly more effective ozone generation.

To achieve even better cooling, it is further proposed that the ozone generating elements be situated and designed in such a way that process water can flow essentially over the entire surface in the region of the gas discharge between the particular ozone generating elements.

It is also particularly advantageous when the process water is in direct contact with at least one outer electrode of the ozone generating element. In other words, there is no intermediate insulation layer, in particular between the outer electrode and the process water. The effectiveness of the cooling is further increased by use of this measure.

In a particularly preferred embodiment of the invention, conducting means are provided through which a portion of the process water stream is forced to flow between the ozone generating elements. This procedure further improves the effectiveness of the cooling and thus the capacity of the generator, that is, the maximum possible ozone generation rate. To further improve the cooling, it is also proposed that the conducting means be designed in such a way that the process water flows in a spiral through the intermediate spaces between the ozone generating elements.

To establish a forced flow between the ozone generating elements in a comparatively simple manner, it is further proposed that the ozone generating elements be at least partially surrounded by a jacket which covers an intermediate space between the ozone generating elements on their front faces, and that recesses be provided in the edge region of the ozone generating elements through which the process water can flow between the ozone generating elements. The jacket may be situated at somewhat of a distance from and outside the ozone generating elements, and for a cylindrical electrode shape, radially outside the ozone generating elements, so that water is not constrained to flow only through the recesses between the ozone generating elements. However, the recesses are preferably dimensioned so that, in comparison to an edge gap between the jacket and the ozone generating elements, the flow characteristics of the cooling water are substantially determined by the recesses.

In a further embodiment of the invention, it is preferred that the recesses, viewed in the direction of stacking of the ozone generating elements, are offset with respect to one another. The recesses are preferably situated in the edge region of the ozone generating elements, and are offset in such a way that the configuration resembles a stairstep structure when viewed in the direction of the plane of the plates.

This design is particularly suited for forcing a spiral flow of process water in the intermediate spaces between the stacked ozone generating elements when partitions, for example separating ridges, are provided to ensure circular flow through the intermediate space between the ozone generating elements, from one recess to the next recess in an adjoining ozone generating element, and the flow in the intermediate space situated above, between the adjoining ozone generating element and the subsequent ozone generating element, likewise has a circular design. In other words, speaking in graphical terms, the circular flow along the width, for example, of a recess continues in an offset manner to the next plane, and so forth. Flow preferably passes through the intermediate spaces between all the ozone generating elements until the water stream exits into a process chamber at the top ozone generating element.

A significant portion of the electrode surfaces may be effectively cooled by this procedure. Thus, it is possible to achieve high ozone generation rates using a comparatively small space. In addition, the number of stacked ozone generating elements is basically unlimited since, with respect to the maximum possible heat removal for a number of ozone generating elements used up to that point, the cooling of the ozone generating elements is far from reaching its capacity limit.

In a further preferred embodiment of the invention, at least the outer surfaces of the ozone generating elements are made of stainless steel. The outer electrodes are advantageously produced entirely from stainless steel. As the result of the cooling principle for the ozone generating elements via their intermediate spaces, materials may be used which have a considerably lower heat conductivity compared to aluminum, but which have other advantages in contrast to aluminum. The use of stainless steel results in an exceedingly corrosion-resistant design which in turn ensures a comparatively long service life and reliability of the ozone generator.

BRIEF DESCRIPTION OF THE DRAWINGS

Two exemplary embodiments of the invention are illustrated in the drawings, and are explained in greater detail with reference to further details and advantages.

FIG. 1a shows an ozone oxidizer in a partially cutaway side view;

FIG. 1b shows an enlarged detail of an ozone generating element according to FIG. 1a;

FIG. 3b shows an enlarged perspective view of a detail of the stack of ozone generating elements according to FIG. 3a.

DETAILED DESCRIPTION OF THE INVENTION

Figure 1:
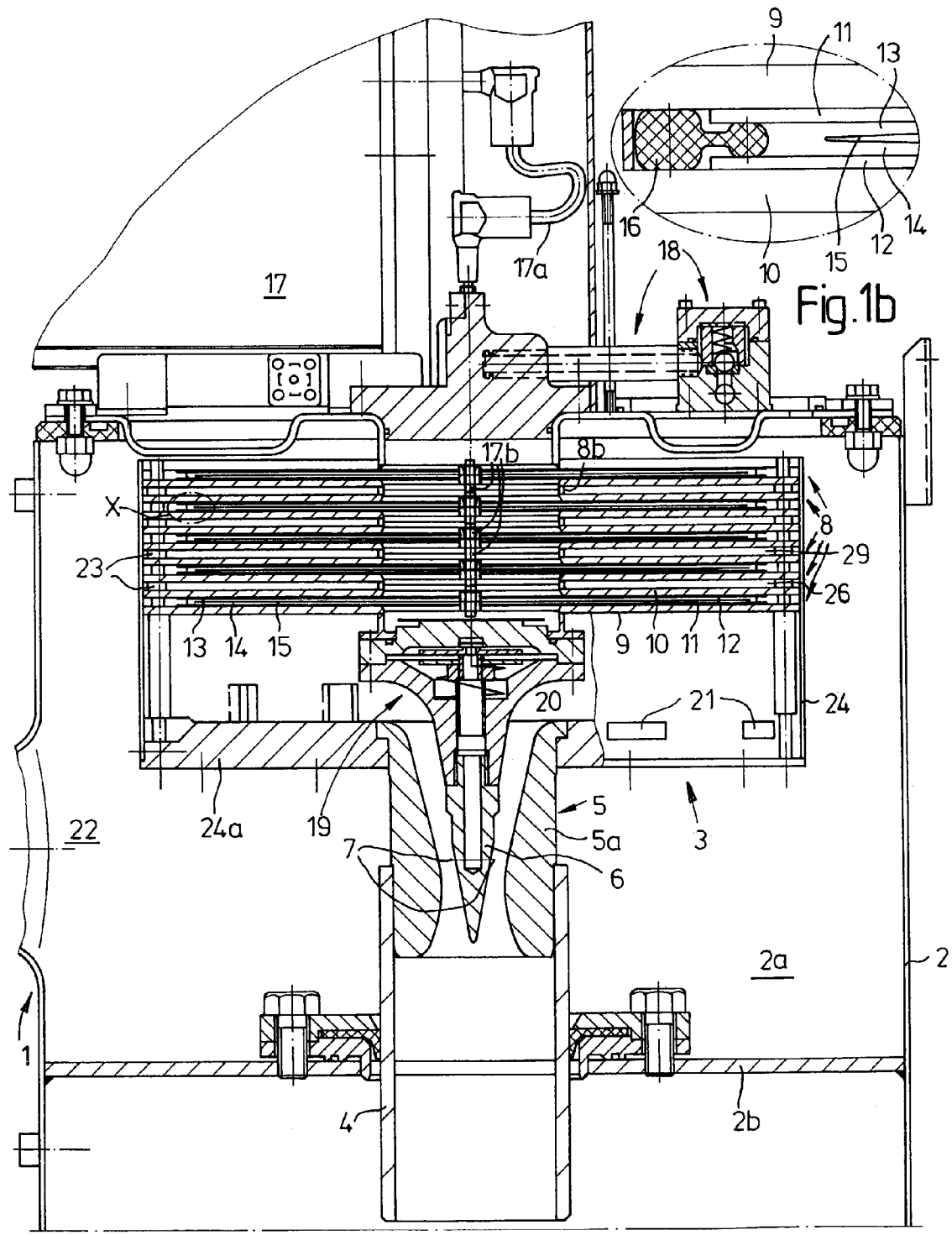

FIGS. 1a and 1b show an ozone oxidizer 1 having a process chamber housing 2 which is sealed with respect to the outside. An ozone generating unit 3 is situated in process chamber 2a of housing 2. A water feed pipe 4 is sealingly inserted in base 2b of housing 2. Water feed pipe 4 merges into a Venturi nozzle unit 5 mounted on the underside of ozone generating unit 3. Venturi nozzle unit 5 comprises a Venturi nozzle 5a, inside of which an injector element 6 having discharge outlets 7 is centrally situated. Injector element 6 is attached at separate locations to the underside of a stack of ozone generating elements 8 of ozone generating unit 3 by a valve arrangement 19. Water flowing in through water feed pipe 4 is led at high velocity past discharge outlets 7, from which gas having a specified proportion of ozone which has been formed in ozone generating elements 8 flows out.

Ozone generating elements 8 comprise two outer electrodes 9, 10 (see in particular FIG. 1b), along each of which, viewed inwardly, a glass plate 11, 12 runs as electrical insulation. The glass plates are positioned at a specified interval by spacers (not shown), the intermediate space between the glass plates being sealed gas-tight by a sealing element which runs in a clamped manner along the outer edge. In the region between glass plates 11, 12 an inner electrode 15 is situated, preferably centrally, the diameter of which is smaller than that of glass plates 11, 12. Two discharge chambers 13, 14 are thus created in which a corona discharge may be established between each of glass plates 11, 12 when high voltage is applied to inner electrode 15 and appropriate process gas is led in.

Figure 2:
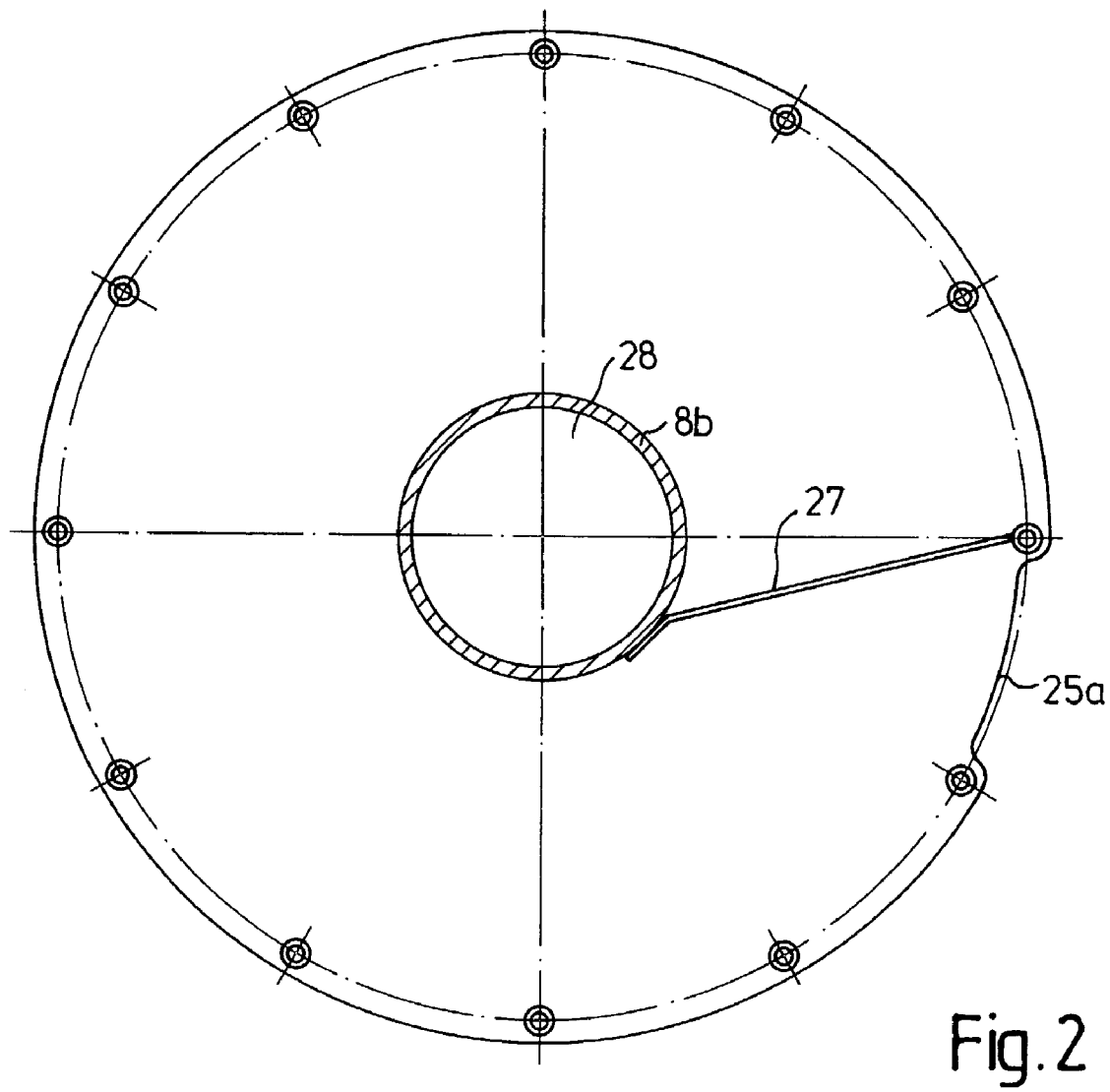
FIG. 2 shows an ozone generating element of an ozone generating unit according to FIGS. 1a and 1b, in a top view.

A high-voltage unit 17 is provided for the high voltage supply which can apply high voltage to the inner electrodes via connecting elements 17a, 17b. Connecting elements 17b are each centrally led from inner electrode 15 to inner electrode 15 in a core region 8a of ozone generating elements 8. Core region 8a is sealed gas-tight with respect to the outside by outer electrodes 9, 10, sealing elements 16, and annular wall sections 8b (also see FIG. 2).

For the preparation of process gas, which may be technical grade oxygen, air, or an oxygen-gas mixture, a gas inlet is provided via a valve unit 18 which feeds the process gas under pressure to the gas-tight sealed region of ozone generating unit 8. A silent electric discharge (corona discharge) is formed by a high voltage applied to the inner electrodes, resulting in the generation of ozone in a known manner. The ozone-enriched process gas is fed to outlet openings 7 of Venturi nozzle unit 5 via valve arrangement 19, and at that location streams into the process water flowing by.

Valve arrangement 19 prevents process water from entering the sealed region of ozone generating elements 8 via Venturi nozzle 5.

The process water flowing out of Venturi nozzle unit 5 enters a region 20 below stacked ozone generating elements 8. At this point, part of the process water leaves region 20 in process chamber 2, through outlet openings 21 in a jacket 24 surrounding the ozone generating elements and region 20, and can run off via an outlet pipe 22 in process chamber housing 2. The volume encompassed by jacket 24 is bounded on the lower side by a base plate 24a in which Venturi nozzle 5a is securely inserted.

Stacked ozone generating elements 8 are held at a distance from one another by spacers 23, thereby forming intermediate spaces 26, 29 between ozone generating elements 8 up to a core cross section 28 defined by annular wall sections 8a.

The portion of the process water which does not leave region 20 through outlet openings 21 is forced to flow through these intermediate spaces 26, 29, and does not exit ozone generating unit 3 until reaching the topmost ozone generating element 8 in process chamber 2a.

Figure 3A:
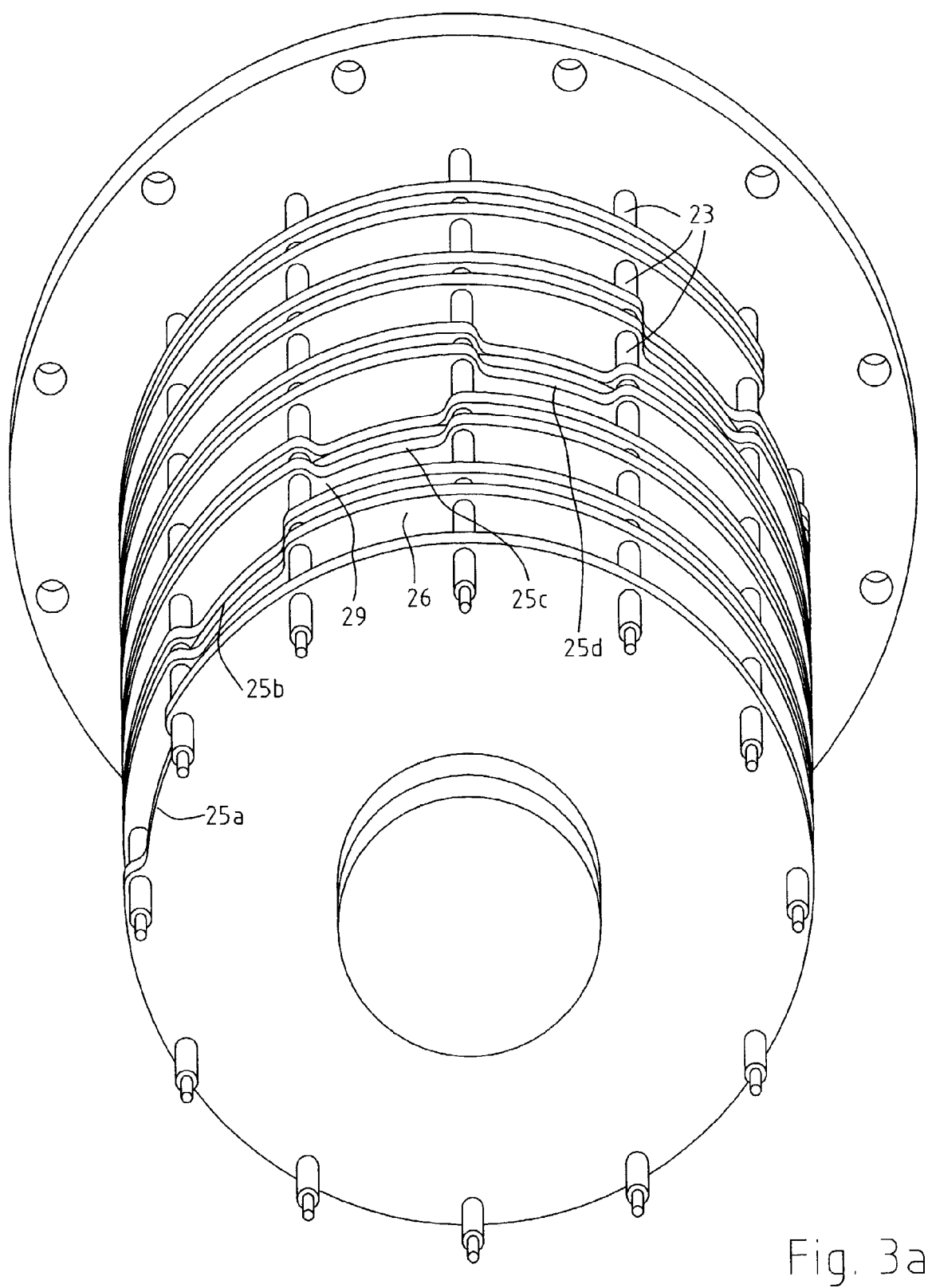
FIG. 3a shows partially mounted stacked ozone generating elements in an oblique perspective view from the bottom.
Figure 3B:
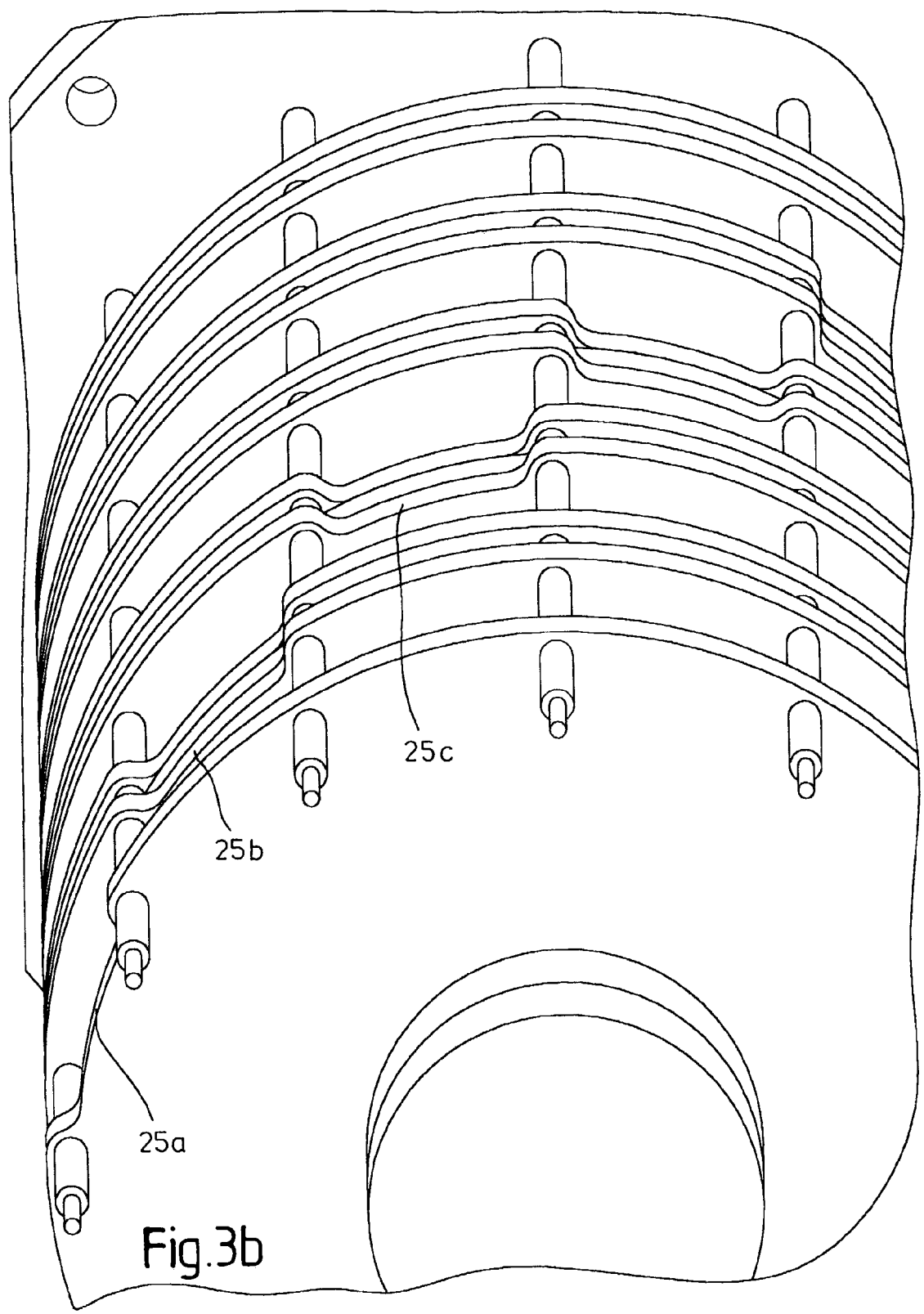

For the formation of a circular, spiral-shaped water flow through intermediate spaces 26, 29 via the stack of ozone generating elements 8, ozone generating elements 8 have recesses 25a, 25b, 25c, 25d at their outer edges which are configured in a stairstep manner, viewed in the direction of jacket surface 24 (see in particular FIGS. 3a and 3b).

The stack of ozone generating elements illustrated in FIGS. 3a and 3b may be used in an ozone generator 1 according to FIG. 1a.

Process water is able to flow into intermediate space 26 between the first two bottom ozone generating elements 8 via a recess 25a. The water entering through recess 25a is forced into a circular flow, shown here in the counterclockwise direction as an example, about core cross section 28 by means of a baffle plate 27 and the surrounding jacket 24 (not illustrated in FIGS. 3a and 3b). In the same manner, an interference in the clockwise direction is also possible. In addition, it is conceivable to reverse the direction of flow from ozone generating element to ozone generating element.

Baffle plate 27 separates intermediate space 26 from wall section 8b approximately to the point of jacket 24. As before, small gaps appearing toward the outside may be disregarded by appropriate dimensioning in the hydrodynamic sense.

The water flowing in through recess 25a thus reaches the back side of baffle plate 27. At that point, the water can flow, through a recess 25b situated in this segment in ozone generating element 8 situated above, into intermediate space 29 between this ozone generating element 8 and subsequent ozone generating element 8. A baffle plate 27 likewise situated at that location ensures that the identical circular flow is produced in the clockwise direction. Corresponding recesses 25c, 25d, and so forth are provided with corresponding baffle plates 27 in ozone generating elements 8 situated above, so that a spiral flow is established between ozone generating elements 8 up to the topmost ozone generating element 8, the spiral flow exiting ozone generating unit 3 into process chamber 2 at the first ozone generating element situated above. This portion of the water as well may then run off through outlet pipe 22.

A particularly effective cooling of the ozone generating elements is thus achieved. In this manner the ozone generating elements may be operated in a capacity range which, in a conventional design without intermediate spaces between the ozone generating elements, would result in premature destruction of the ozone generating unit. By operating the ozone generating unit at a higher capacity the ozone generation rate can be significantly increased, so that the ozone generating unit operates much more effectively. In a system performing sterilization using ozone, ozone generating units may thus be conserved, or designed with smaller volumes.

A further significant advantage of such a design lies in the fact that, on account of the improved cooling, outer electrodes 9, 10 of ozone generating elements 8 as well as wall sections 8b may be produced from stainless steel. The high corrosion resistance of stainless steel ensures a long service life and high reliability.

When such an ozone generating unit is used for processing water in swimming pools, the heating of the water during cooling of ozone generating elements 8 contributes to heating the water in the swimming pool as well.

What is claimed is:

1. An ozone generator comprising a plurality of ozone generating plates, stacked one on top of the other, which are configured to be at least partially surrounded by externally flowing process water and configured to enrich the process water with ozone produced by the ozone generator, each of the ozone generating plates having at least one electrically insulated inner electrode and at least one outer electrode, between which a space is provided for a gas discharge, wherein the ozone generating plates are stacked at a distance from one another such that the process water is able to flow between the ozone generating plates over substantial surface regions of the ozone generating plates.

2. The ozone generator according to claim 1, wherein the ozone generating plates are situated and designed in such a way that process water can flow essentially over the entire surface in the region of the gas discharge between the particular ozone generating plates.

3. The ozone generator according to claim 1, wherein the process water is in direct contact with at least one of the outer electrodes of at least one of the ozone generating plates.

4. The ozone generator according to claim 1, wherein the ozone generating plates are arranged such that a portion of the process water stream is forced to flow between the ozone generating plates.

5. The ozone generator according to claim 1, wherein the ozone generating plates are arranged such that the process water flows in a spiral through intermediate spaces between the ozone generating plates.

6. The ozone generator according to claim 1, wherein the ozone generating plates include front faces and the ozone generating plates are at least partially surrounded by a jacket which covers an intermediate space between the ozone generating plates on the front faces, and wherein recesses are provided at an edge region of the ozone generating plates through which the process water can flow between the ozone generating plates.

7. An ozone generator comprising a plurality of ozone generating plates, stacked one on top of the other, which are in at least partial contact with a process water stream, each of the ozone generating plates having at least one electrically insulated inner electrode and at least one outer electrode, between which a space is provided for a gas discharge, wherein the ozone generating plates are stacked at a distance from one another such that the process water is able to flow between the ozone generating plates over substantial surface regions of the ozone generating plates, wherein the stacked ozone generating plates have recesses at edge regions of the ozone generating plates and wherein the recesses, viewed in the direction of stacking of the ozone generating plates, are offset with respect to one another.

8. An ozone generator comprising a plurality of ozone generating plates, stacked one on top of the other, which are in at least partial contact with a process water stream, each of the ozone generating plates having at least one electrically insulated inner electrode and at least one outer electrode, between which a space is provided for a gas discharge, wherein the ozone generating plates are stacked at a distance from one another such that the process water is able to flow between the ozone generating plates over substantial surface regions of the ozone generating plates, wherein the stacked ozone generating plates have recesses at edge regions of the ozone generating plates and wherein the recesses, viewed in the direction of stacking of the ozone generating plates, are offset with respect to one another and partitions are provided between the ozone generating plates to ensure circular flow through intermediate spaces between the plates, from one recess to the next recess in adjoining ozone generating plates, and the flow in the intermediate spaces, between the adjoining ozone generating plates have a circular design.

9. The ozone generator according to claim 1, wherein outer surfaces of the ozone generating plates are made of stainless steel.

* * * * *